Figure 1:
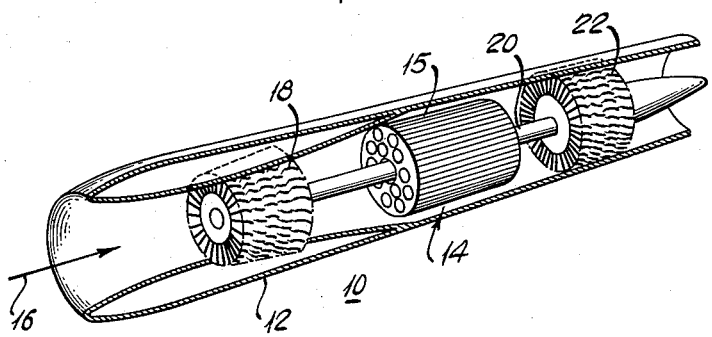

Dec. 1, 1964     A. FERRI     3,158,990
RAM-JET ENGINE
Filed April 21, 1959

INVENTOR
ANTONIO FERRI
BY
Curtis, Morris & Safford
ATTORNEYS

United States Patent Office 3,158,990
Patented Dec. 1, 1964

3,158,990
RAM-JET ENGINE
Antonio Ferri, Rockville Centre, N.Y., assignor to General Applied Science Laboratories, Inc., Hempstead, N.Y., a corporation of New York
Filed Apr. 21, 1959, Ser. No. 807,887
2 Claims. (Cl. 60—35.3)

This invention relates to a modified ram-jet engine which uses a heat exchanger as an energy source, and to an improved method of operation to obtain higher efficiency and speed.

An object of the invention is to provide an engine which can operate at appreciably higher speed than can a conventional ram-jet engine.

Another related object is to provide an engine having the basic simplicity of a ram-jet engine but with substantially improved efficiency at very high speeds.

A ram-jet engine operates by moving through the air at very high speed (for example, Mach 2, which is about 1300 miles per hour) and scooping in air which by virtue of the high speed is compressed without the need for mechanical compression. This high velocity compressed air is then passed through a heating zone within the engine and exhausted at still higher velocity to obtain net forward thrust. In a ram-jet engine wherein the heat source comprises a heat exchanger, which in turn may derive its energy from a nuclear reactor, as the speed of the engine moving through the air becomes higher, the efficiency of the engine quickly falls off to a point where it can no longer produce a useful amount of thrust. The present invention overcomes this difficulty and extends the upper limit of speed at which an engine of this general kind can operate efficiently.

The upper limit on the speed of such a ram-jet engine is determined by the temperature limitations of practical existing materials for the heat exchanger in the engine. A practical operating temperature imposed by these restrictions may for example be about 2,500° Rankine. Now, in considering the top flight speed at which such an engine can do useful work the total or stagnation temperature of the air must be taken into account. Stagnation temperature, as explained more fully in the inventor's copending U.S. application Serial No. 640,935 filed February 18, 1957 (23,553), is the equivalent temperature the air would have if decelerated to standstill from its speed relative to that of the engine. At higher and higher Mach numbers the stagnation temperature of the propulsive gas (air) entering the heating chamber of the engine approaches or exceeds the operating temperature of the engine heat exchanger, and so as a practical matter no energy can be transferred from the exchanger to the gas and the engine loses its thrust at these speeds. The present invention, accepting a practical temperature for the heat exchanger makes it possible to operate a ram-jet type engine of this kind at speeds well above those previously attainable.

In accordance with the present invention, air taken into a ram-jet engine has a considerable amount of "energy" extracted from it by a turbine before the air enters the heating chamber of the engine. The air, by loss of this energy, thus has its stagnation temperature correspondingly lowered. This in turn means that energy in the form of heat can be efficiently transferred to the air from the engine heat exchanger operating at a practical temperature, and useful thrust obtained from the engine. To further improve the efficiency of the engine, the energy initially extracted by the turbine from the airstream upon entering the engine is added by means of a compressor to the air being expelled from the heat chamber of the engine.

Figure 2:
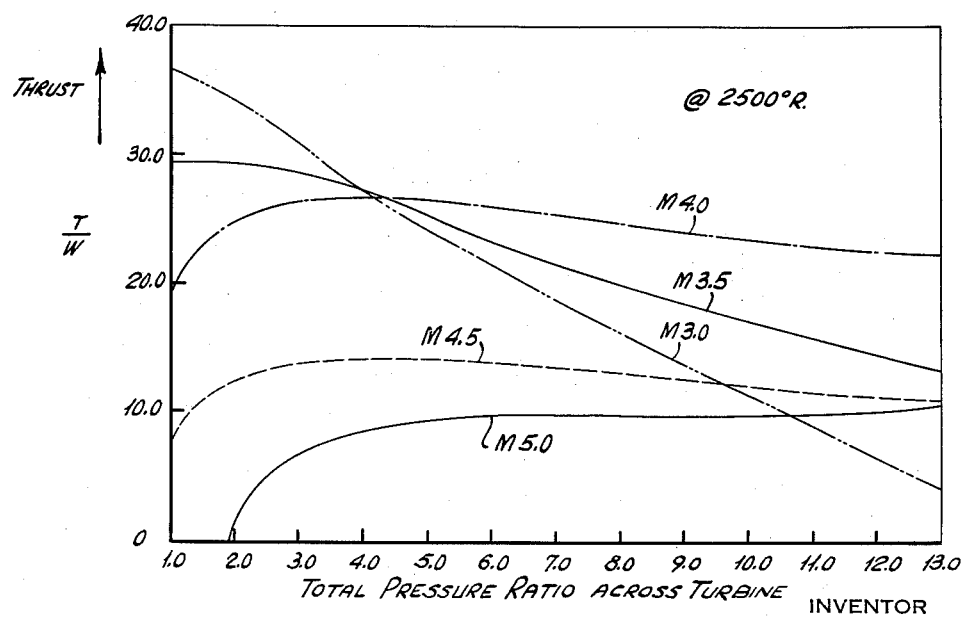

A better understanding of the invention together with a fuller appreciation of its many advantages will best be gained from the following description given in connection with the accompanying drawings wherein:

FIGURE 1 is a perspective view, partly broken away, showing a modified ram-jet engine embodying features of the invention; and FIGURE 2 is a graph illustrating the improvement in thrust obtained from the engine as a function of the turbine pressure ratio, which is a measure of the energy extracted from the entering airstream at the various Mach numbers indicated.

The engine 10 shown in FIGURE 1 comprises a housing 12 defining an axial bore and surrounding a heating chamber 14 and a heat exchanger 15. The latter is maintained at a suitable operating temperature, e.g. 2500° R., from a primary source of heat, such as a nuclear reactor, which is not per se the invention herein. A description of such a reactor can be found in "Nuclear Reactor Engineering," Chaper 13, by S. Glasstone; D. Van Nostrand Co., 1955. Air enters engine 10 in the direction of arrow 16 but before entering the heating chamber passes through and drives a bladed turbine 18. The total pressure ratio across this turbine is a measure of the energy removed from the air before it enters heating chamber 14, this energy being transferred by means of shaft 20 to a compressor 22 which imparts the energy to the propulsive gas being expelled from the chamber.

As was explained, the equivalent temperature of the air entering this chamber must be somewhat less than the temperature of exchanger 15 to permit the transfer of heat energy from the exchanger. Assuming a heat exchanger temperature of 2500° R., FIGURE 2 shows a family of curves of engine thrust per pound of air taken in per second ($T/W$) versus the ratio of air total pressure entering the engine to the total pressure in chamber 14. This ratio, as was mentioned, is a measure of the energy which is taken from the entering air by turbine 18 for efficient operation at the speeds indicated. At a speed of Mach 5, this ratio should be approximately between 5 and 7 to obtain the maximum thrust of about ten pounds per pound of air per second. For a pressure ratio of 1.0 (no turbine or compressor) at this speed of Mach 5 a negative thrust from the engine is indicated, meaning that it could not then produce useful work. On the other hand, for a speed of Mach 3, engine thrust actually decreases as more and more energy is removed from the entering airstream. This means that it would be more efficient at this low speed to dispense with turbine 18 and compressor 22. However, in the range approximately from Mach 3.5 plus to 5.0 plus, substantial improvement in thrust is obtained as indicated. Thus for a given operating temperature, there is a range of speeds near the speed at which the stagnation temperature of the air equals the operating temperature of the engine and within which thrust and efficiency are greatly increased by virtue of the invention.

The particular curves in FIGURE 2 were calculated on the assumptions that operating temperature is 2500° R., that the energy absorbed by turbine 18 is wholly transferred to compressor 22, that each have an isentropic efficiency of 85%, and that perfect gas laws apply. Some deviations from these curves will be found under measured conditions though the general family relationships will still apply.

The above description of the invention is intended in illustration and not in limitation. Various changes or modifications of the invention as specifically described may occur to those skilled in the art and these can be made without departing from the spirit or scope of the invention as set forth.

I claim:

1. A method of operating a ram-jet type of engine to obtain improved thrust at supersonic speeds where air stagnation temperature approaches the operating temperature of the engine, said method comprising the steps of taking an engine having a tubular bore surrounding a heat chamber, supplying a large amount of energy to said chamber to produce a high temperature R., moving said engine through the air at a supersonic speed having an air stagnation temperature too high for normal ram-jet engine operation at said temperature R., extracting part of the energy from the air entering the engine in accordance with engine flight speed to give improved operating efficiency and to facilitate transfer of heat energy from the heat chamber to the air, and thereafter discharging said heated air from said chamber to produce net forward thrust sufficient to maintain said engine in flight at said speed.

2. The method as in claim 1 wherein the amount of energy extracted from the air entering said engine for a given engine flight speed and operating temperature are set to give best efficiency in accordance with a family of curves as in FIGURE 2.

References Cited in the file of this patent

UNITED STATES PATENTS

| | | |
|---|---|---|
| 2,405,919 | Whittle | Aug. 13, 1946 |
| 2,503,250 | Eckert | Apr. 11, 1950 |
| 2,524,066 | Andersen | Oct. 3, 1950 |
| 2,894,891 | Grebe | July 14, 1959 |

FOREIGN PATENTS

| | | |
|---|---|---|
| 754,559 | Great Britain | Aug. 8, 1956 |